UNITED STATES PATENT OFFICE.

MAX ENGELMANN, OF ELBERFELD, GERMANY, ASSIGNOR TO FARBENFABRIKEN VORM FRIEDR. BAYER & CO., OF ELBERFELD, GERMANY, A CORPORATION OF GERMANY.

PROCESS OF MAKING ALKYL ETHERS OF AROMATIC BODIES.

No. 863,792.      Specification of Letters Patent.      Patented Aug. 20, 1907.

Application filed February 23, 1907. Serial No. 358,969.

*To all whom it may concern:*

Be it known that I, MAX ENGELMANN, doctor of philosophy, chemist, a citizen of the German Empire, residing at Elberfeld, Germany, Kingdom of Prussia, have invented new and useful Improvements in Processes of Making Alkyl Ethers, of which the following is a specification.

The present invention relates to a new and useful process for producing alkyl ethers of hydrocarbons containing one or several phenolic hydroxyl groups. The alkylation is effected by treating the said compounds with the nitroso derivatives of alkylic ureas and alkaline agents. By this treatment the hydrogens of the (OH) groups are replaced by the alkyl groups of the nitroso urea compounds which are used. From mono- di- or poly-hydroxy compounds mono-, di- and poly-ethers can be obtained.

In order to illustrate the new process more fully the following examples are given, the parts being by weight.

*Example A.* A solution of 2 parts of sodium hydroxid in a small quantity of water is added to a suspension of 15 parts of morphin in 100 parts of methyl alcohol. 6 parts of nitroso monomethyl urea are then slowly introduced into the solution cooled to 0° C. After the reaction is complete the methyl alcohol is distilled off, caustic soda solution is added, and the codein is isolated by extraction with benzene from which it is obtained in a pure state. The reaction probably takes place in accordance with the following equation:

$$C_{17}H_{19}NO_3 + C_2N_3O_2H_5 + NaOH =$$
$$C_{18}H_{21}NO_3 + 2N + NH_2COONa + H_2O.$$

*Example B.* 15 parts of beta-naphthol are dissolved in 100 parts of a normal solution of KOH and 7 parts of nitroso diethyl urea are slowly added during cooling. The beta-naphthol ethylic ether separates. It is filtered off and purified by crystallization. The reaction probably takes place in accordance with the following equation:

$$C_{10}H_7OH + C_5N_3O_2H_{11} + KOH =$$
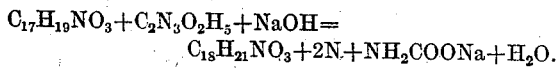

*Example C.* 55 parts of nitroso monomethyl urea are added to a solution of 55 parts of pyrocatechin in 2000 parts of ethyl alcohol, the mixture is cooled to 0° C. and a solution of 20 parts of NaOH in a small quantity of water is slowly run into the solution. After the reaction is complete, it is filtered, the alcohol is distilled off and the pyrocatechin monomethyl ether (guaiacol) is purified by a fractional distillation *in vacuo.* The reaction probably takes place in accordance with the following equation:

$$C_6H_4(OH)_2 + C_2N_3O_2H_5 + NaOH =$$
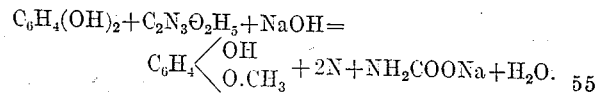

*Example D.* 124 parts of guaiacol are dissolved in 2000 parts of methylic alcohol, and to this solution 140 parts of nitroso dimethyl urea (M. P. 96°) are added. This mixture is cooled to 0° C., and a concentrated watery solution of 160 parts of hydroxid of barium is added slowly while stirring. The methylic alcohol is then distilled off, the residue is shaken out with ether, and the dimethyl ether of pyrocatechin—called "veratrol"—is left after distilling off the ether. The resulting product is purified by fractional distillation. The reaction probably takes place in accordance with the following equation:

$$2C_6H_4(OH)(O.CH_3) + 2C_3N_3O_2H_7 + Ba(OH)_2 =$$
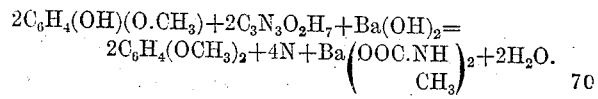

*Example E.* 126 parts of pyrogallol are dissolved in 2000 parts of methylic alcohol, and 120 parts of concentrated soda-lye are added. To this solution, cooled to 0° C., 400 parts of nitroso diethyl urea are added. After the end of the reaction the methylic alcohol is distilled off, the residue is shaken out with ether, and after distilling off the ether, the triethyl ether of pyrogallol is left back. The resulting product is purified by fractional distillation and crystallization. The reaction probably takes place in accordance with the following equation:

$$C_6H_3(OH)_3 + 3C_5N_3O_2H_{11} + 3NaOH =$$
$$C_6H_3(OC_2H_5)_3 + 6N + 3NH.C_2H_5COONa + 3H_2O.$$

Other aromatic hydroxyl substituted hydrocarbons, such as phenol or its derivatives, other naphthols, dioxynaphthalenes, anthrol, etc., or other alkaline compounds, such as $$Ba(OH)_2, Ca(OH)_2, NH_3, C_2H_5NH_2, (C_2H_5)_2NH,$$

or the like, may be used. If these alkaline compounds are employed, quantities corresponding to one molecule in the equations given above must at least be used; generally speaking an excess does no harm.

Having now described my invention and in what manner the same is to be performed, what I claim as new and desire to secure by Letters Patent is:—

1. The process of preparing alkyl-ethers of the aromatic series, which process consists in treating hydroxyl-substituted hydrocarbons containing phenolic hydroxyl groups with nitroso derivatives of alkylic ureas and alkaline compounds, substantially as described.

2. The process of preparing alkyl-ethers of morphin, which process consists in treating morphin with nitroso derivatives of alkylic ureas and alkaline compounds, substantially as described.

3. The process of preparing codein, which process consists in treating morphin with nitroso derivatives of methylic ureas and alkaline compounds, substantially as described.

4. The process of preparing codein, which process consists in treating morphin with nitroso monomethyl-urea and alkali, substantially as described.

In testimony whereof I have hereunto set my hand in the presence of two subscribing witnesses.

MAX ENGELMANN. [L. S.]

Witnesses:
OTTO KÖNIG,
J. A. RITTERSHAUS.